Jan. 3, 1956  J. CHOUSSY  2,729,737
METHOD OF AND MEANS FOR LOCALIZING HEAT AND REACTIONS
IN LIMITED PORTIONS OF FLUID BODIES
Filed April 14, 1953

INVENTOR.
JEAN CHOUSSY
BY
Dale A. Bauer
ATTORNEY

United States Patent Office 2,729,737
Patented Jan. 3, 1956

2,729,737

METHOD OF AND MEANS FOR LOCALIZING HEAT AND REACTIONS IN LIMITED PORTIONS OF FLUID BODIES

Jean Choussy, Lyon, France, assignor to Societe Anonyme des Manufactures des Glaces et Produits Chimiques de Saint-Gobain, Chauny & Cirey, Paris, France Application April 14, 1953, Serial No. 348,651

3 Claims. (Cl. 219—40)

This invention includes a new method and novel apparatus for improving the heating of liquids by Joule effect. The heating of liquids by Joule effect is well known and consists generally of introducing electrodes into the liquid, the electrodes being composed of metal or of graphite, so that the electric current passes from one electrode to the other through the liquid, which to some extent, plays the part of a heating resistance. The quantity of energy transformed to heat, for a given amperage, is a function of the resistance offered by the liquid to the passage of the electric current.

The present invention, which employs the same principle of heating, has as a principal object to increase the quantity of electrical energy transformed to heat for a given amperage.

Another object of the invention is to improve the efficiency of reactions which occur in fluid medium in the presence of Joule effect.

Another object is to localize the occurrence of reactive phenomena, such as the release of gas, in a large body of fluid in order to simplify the capture of the gas and the problems of securing adequate temperature to foster the reaction producing the gas, and particularly to reduce the consumption of energy needed to produce the gas. Thus, by this invention, it is possible to localize a reaction in the middle of a large body of fluid by limiting the temperatures at which the reaction proceeds to a localized zone, without the use of expensive constructions of mechanical or electrical nature.

A particular object of the invention is to improve the operation of processes in which there is a release of gaseous bubbles either by chemical reaction or by distillation.

Another object is to simplify and improve the release of gaseous bubbles which have been dissolved or occluded in a fluid.

Another object is to improve reactions of which one reactant is a gas, and which proceed with the assistance of Joule effect, by introducing the gaseous reactant at the bottom of a thin column of the liquid reactant through which the necessary current is being forced.

Another object is to obtain the absorption of a gas by chemical reaction with the liquid by introducing the gas at the bottom of a slender column of liquid, within a much greater mass of the liquid, through which the current is made to flow.

The objects of the invention are accomplished, generally speaking, by accumulating a body of the fluid that is to be heated by Joule effect, by disposing therein electrically non-conductive barriers which set off within the fluid one or more zones of reduced section, that is, of section less than the general section of the bath, and usually far smaller, these zones being vertically arranged. In such constructions, the shape and the position of the barriers is such that the passage of the electric current is canalized in the zone. In the relatively small section of the zone the current acquires a much greater heating effect. The zone of reduced section communicates with the general body of liquid at different levels, for instance at or near the top of one barrier and at or near the bottom of the other, so that the current and liquids flowing in the zone travel approximately vertically.

In view of the high ohmic resistance of the liquid in the said restricted zones, zones of small section, the temperature of the liquid there is relatively high compared to the temperature of the general body of liquid. These zones are aligned more or less vertically, so that the liquid can thereby be made to circulate, under the influence of this higher temperature; a chimney effect may thus be set up, and an accelerated replacement of the liquids submitted to the Joule effect heat in these zones be secured.

The invention is very useful in the simple heating of fluids in which no chemical action or release of gas occurs as it enables one, without special electrical apparatus to more rapidly attain higher temperatures in a given body of liquid, and to gain more rapid flow without impellers of mechanical type. The invention finds special application when the object of heating is to eliminate gas from a fluid, or to effect a distillation. In such cases, the accelerated replacement of the liquid in the zones of reduced section is further increased by the release of the bubbles of gas dissolved in the fluid, or by the release of liquid vapors generated by boiling. Furthermore, the intense formation and release of bubbles in the said hot zones increases the ohmic resistance of the liquid through which the current of electricity is passing, and this serves to additionally raise the temperature and increases the efficiency of the process.

In addition, the release of the gases is favored by the vertical disposition of the space where the gases are generated, that is, the hot zone, and this gaseous release, by forming an emulsion, itself favors the circulation of the liquid in this space. As a result, the several phenomena all contribute to the increased efficiency of the apparatus and the process.

If the object of the process undertaken is to isolate and gather a gas that is released by heating, as for example, in the case of the distillation of muriatic acid for the production of concentrated hydrochloric acid gas, the process is most easily carried out by the new invention in a novel construction to be hereinafter described, by which the gas is released in a constricted zone, sequestered over the said constricted zone, and is withdrawn therefrom by a simple conduit or other simple apparatus. There are given hereafter, as non-limitative examples of the invention, a variety of methods and apparatus which constitute embodiments of the invention.

Figure 1:
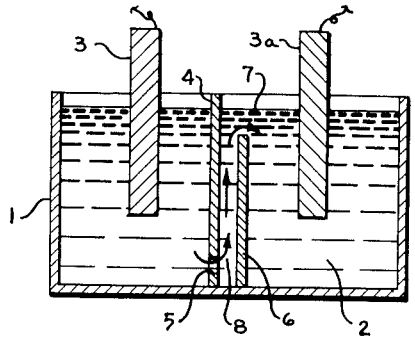
Fig. 1 is a vertical section through an open-topped heating vessel constructed in accordance with the principles of the invention.

Referring now to Fig. 1, the numeral "1" indicates an open-topped reaction vessel of tank type which is composed of electrically non-conductive material. That material should also be resistant to the fluids which are to be treated in it. The tank is filled to its normal liquid level by a liquid 2, which in the present instance will be assumed to be water with the addition of a sufficient quantity of an electrolyte, such as common salt, to make it carry the current between the electrodes 3 and 3a which are immersed in the liquid at opposite ends of the tank. These electrodes may be of any desired size and shape, either rod electrodes or plate electrodes or block electrodes, and may even be set into the end walls of the tank, if desired. The tank 1 is transversely partitioned by a barrier consisting of two walls 4 and 6, of which wall 4 extends downward to the bottom from a line above the liquid level and is apertured at the bottom by slits or holes 5 which permit the liquid in the left-hand portion of the tank to make its way into the canal 8 between the two walls. The wall 6 extends upward from the bottom to a position somewhat below the liquid level so that the liquid in the canal 8, can flow over it into the right hand section of the tank. The walls 4 and 6 extend from wall to wall of the tank 1 and are made of electrically non-conducting material such as stone, ceramic, porcelain, silica, etc. The walls 4 and 6 are quite close together and establish a column or canal 8 which is of greatly reduced section compared to the section of the liquid masses on either side of the barrier. Consequently, this canal of liquid has an ohmic resistance which is relatively high and is consequently heated more than the remainder of the bath by the electric current. Because of this difference of temperature the liquid circulates rapidly from the bottom to the top of the canal between the walls 4 and 6, entering by opening 5 and issuing over the top of the wall 6 into the space 7. The lines of force of electric flux follow the same path.

In the case of the boiling of water, specifically referred to, the entire mass of water 2 can be brought to a temperature which approaches boiling but is not in ebullition, whereas the water in the column 8, because of its higher temperature, does boil freely. Thus, the actual boiling is limited to the space of the canal and the region directly above it. An advantage of this is that some of the liquid can be more quickly brought to boiling temperature and steam can be derived faster than in the case where the entire mass of water must be brought to the boiling point. The formation of bubbles as the water boils also tends to increase the ohmic resistance in the canal 8 and to further increase the efficiency of the application of heat in the canal. Furthermore, the elevational effect of the bubbles is such as to add to the flow of liquid through the orifice 5 and over the wall 6. Water can be continuously added to the compartment of the electrode 3 to compensate for that which is drawn through the orifice 5 and a continuous production of steam can thus be assured.

Figure 2:
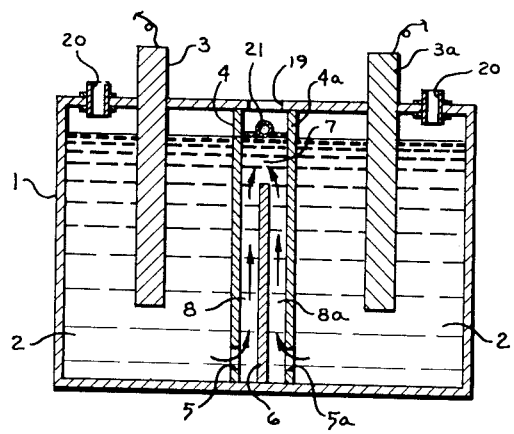
Fig. 2 is a vertical section through an enclosed reaction vessel having a double channel reaction zone.

In Fig. 2 is a modification of the form of the invention shown in Fig. 1. In this case, the tank 1 is enclosed by a top which has ports of entry 20—20 for the admission of the fluid which is to undergo treatment, or for the solid materials which are to be made fluid by treatment. Centrally located walls 4 and 4a, each constructed like wall 4 of Fig. 1, extend downwards from the cover of the tank and are provided with orifices 5 and 5a which admit liquids from opposite ends of the tank to the canal between the walls. These walls form above the liquid level, a space in which the vapor released in the canals can be sequestered and from which it can be withdrawn through an orifice 19. Between the walls 4 and 4a is a wall 6 which extends part way to the surface. The three walls are close together and form the constricted passages 8, 8a which canalize both the liquid which flows therein and the electric currents which flow between the electrodes. In this case, liquid flows into the canal from both ends of the tank and, due to the ascensional forces described above, establishes a liquid level somewhat higher than that on either side. This figure will be further discussed after the preferred embodiment of Fig. 3 has been described.

Figure 3:
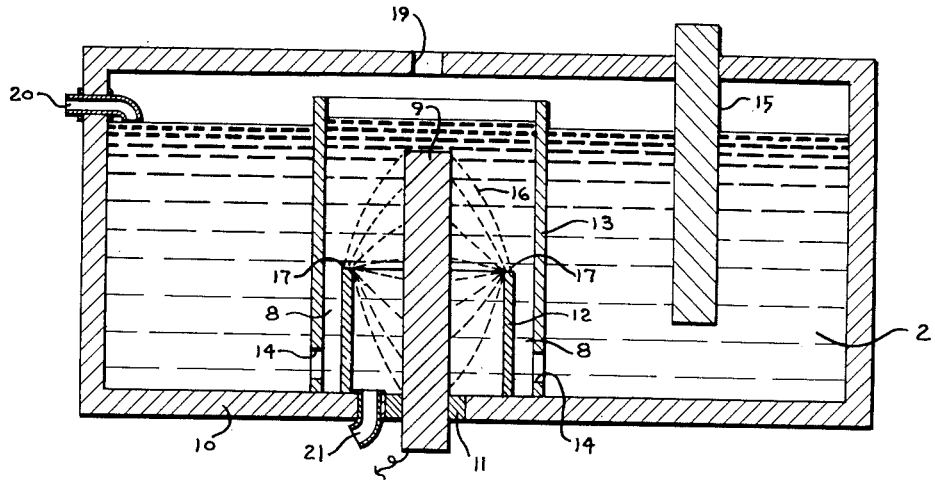
Fig. 3 is a vertical longitudinal section through a preferred form of the invention.

The tank 10 of Fig. 3 is similar to tank 1 of Fig. 2, but the entry port 20 for raw material is located in the side rather than in the cover.

An opening 19 provides for the escape of gas liberated in the canal. A cylindrical electrode 9 is inserted through the bottom of the tank 10 of the furnace by means of a fitting 11 which permits the height of the electrode to be regulated at will.

This electrode is surrounded by a circular wall or baffle 12, which extends upward, from the bottom of the tank, part way to the surface of the liquid. As shown in the drawing, the electrode has been thrust into the interior of the tank to a height approximately twice the height of the wall 12. The wall 12 is composed of electrically non-conductive material and is liquid tight from the bottom to its upper edge. The second co-axial wall 13 extends upward from the bottom to a height above the level of the liquid in the tank but is perforated by openings 14 near the bottom, and below the rim 17. A second cylindrical electrode 15 penetrates the tank from above and these two electrodes are connected by appropriate means to a single source of power. Thus, the electrodes pass current through the fluid in the tank and through the constricted canal 8 which exists between the opening 14 and the top 17 of the wall 12. The diameter of the wall 13 is only slightly greater than that of the wall 12. At the upper edge 17 of the wall 12, the lines of current emanating from electrode 15 are distributed to electrode 9 along the flux lines 16, approximately speaking, of Fig. 3. The liquid between the two walls 12 and 13 is heated to a much higher temperature than that elsewhere in the furnace. This enables the apparatus to be used in processes where it is desirable to restrict the highest operating temperature to a limited zone which is surrounded by protective means.

This example has a particular advantage in that it shows the possibility of fixing at will the paths through which the electric flux in the interior of the liquid will pass, by the location of the zones of reduced section conforming to the invention. In particular, by the relative location of these zones and the electrodes, it is possible to provide that the lines of force shall engage selected parts of the surface of the electrodes, in particular those parts which are particularly advantageous. In the example, the respective positions of the summit of electrode 9 and the superior edge 17 of the interior wall are so placed that the lines of force, which originate at the said edge 17, travel to the cylindrical surface more than to the end of the electrode. This produces the exceptional advantage that the cylindrical surface of the electrode, which is highly resistant to disintegration, is employed far more than the end of the electrode, which is quite subject to disintegration. Graphite electrodes are usually cut off by sawing and the ends are more susceptible to attack than the sides. In order to accomplish this, one regulates the height of the electrode 9 above the bottom of the tank as well as the diameter of the wall 12 and its height above the bottom of the tank. By proper regulation of these factors, as shown in Fig. 3, the wall of the electrode receives the current to the practical exclusion of the end.

Figure 4:
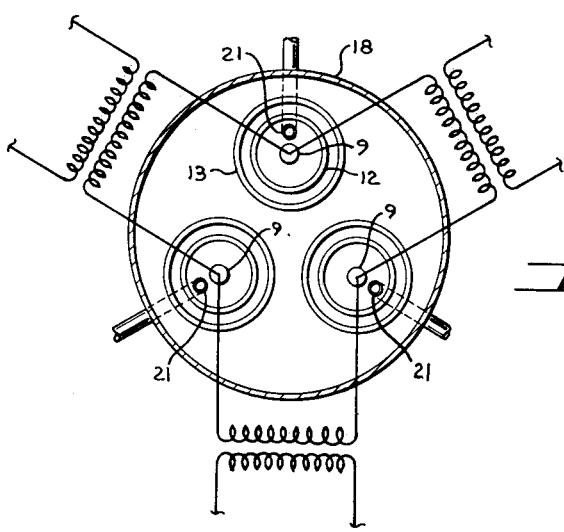
Fig. 4 is a horizontal section through a more complex realization of the preferred form of the invention.

In Fig. 4, a heating vessel 18, of cylindrical form, is provided with Joule effect current by three electrodes 9, of identical size and shape, which are each surrounded by walls 12, 13, such as are shown in vertical section in Fig. 3. The three electrodes are shown to be supplied by three-phase current through three transformers. Tubes 21 are provided to remove liquid products of reaction from the upper part of the liquid 2, as also indicated in Fig. 2.

In the modifications shown in Figs. 2 and 3, it has been presumed that the heating has for its object to induce a release of gas, which can be recovered through orifice 19 of the cover of the tank. It will be seen that the bubbles liberated form, in the liquid of zones 8 and 8a of Fig. 2, an emulsion which increases the ohmic resistance of the masses of liquid in these zones, said masses being rectilinear in Fig. 2 and cylindrical in Fig.

3, thus favoring the circulation of the liquid upward and adding their lifting effect to the thermosyphon effect produced by the heating of the liquid itself.

When, as is generally the case, the operation is continuously carried out, it suffices to provide orifices for the introduction of new liquids, such as 20, in Figs. 2 and 3, as well as orifices through which the concentrated or exhausted or degassed liquid can be removed. Thus, in Figs. 2 and 4, the numbers 21 indicate pipes for the withdrawal of concentrated liquid and the openings 19 indicate ports for the release of gas. It is also possible to use, in Fig. 2, the space between the walls 4 and 4a and above the liquid level as a kind of steam chest, it being assumed that the opening 19 is closed and that the steam provided can be withdrawn through the pipe 21, or, as indicated in other figures, the pipe 21 can be omitted and all the gases accumulated in the steam chest can be drawn off through orifice 19.

Another important advantage of the process of the invention resides in the fact that it permits the location of the hottest part of the liquid to be selected at will. It also becomes possible to control with great precision the maximum temperature attained during heating and thus to prevent all local overheating which might be prejudicial to the liquid treated. Especially, because of the invention, one can place the hottest zone in the boiler, or furnace, at that location which is the most advantageous, for example at the center of the tank, the colder, surrounding liquid thus serving as a protective insulation of the walls against the heat generated in the central zone. This permits, not only to reduce to a minimum the heat losses through the walls, but especially in the case of corrosive liquids in which the power of corrosion increases with the temperature, to protect the walls under the best conditions from the danger of corrosion.

It should be understood that the application of the invention is not limited to the particular apparatus described in the several illustrations of the drawings and the examples.

Thus, the zones of reduced section may be formed in planes or cylinders or in prisms. It is also possible to inject gas at the base of one of these canals to produce an emulsion favorable to heating and to circulation. In the case where the object of heating is the absorption of the gas by chemical reaction with the liquid, the gas may be introduced at the base of the canal, to be absorbed as it ascends through that zone. It is thus possible to employ this type of furnace to particularly and locally energize a chemical reaction and also to maintain in a molten state, or in a fluid state, a body which is to undergo the chemical reaction in the canal.

The following example, shows the results obtained by the application of the invention to the manufacture of pure gaseous hydrogen chloride from the commercial aqueous solution of hydrochloric acid containing 36% of HCl.

It is known that hydrogen chloride forms with water an azeotropic mixture boiling at 110° C. under atmospheric pressure and containing 20.24% HCl. So by the distillation of a mixture of HCl and water containing more than 20.24% HCl one obtains pure HCl gas.

The working out of the invention takes place in the step of the electrical heating of a vat fitted with a rectifying column and supplied through the column by a 36% HCl aqueous solution.

The 100% HCl gas is collected at the top of the column and the exhausted solution containing say 20.5% HCl is continuously drained off from the vat by a suitable pipe.

The cylindrical vat is provided with nine graphite electrodes supplied by a three phase current. Each electrode is surrounded by walls similar to walls 12 and 13 of Fig. 4. The main characteristics of the vat are as follows:

|  | Mm. |
|---|---|
| Ext. diameter of the vat | 1470 |
| Int. diameter of the vat | 1230 |
| Diameter of the electrodes | 90 |
| Height of the electrodes above the bottom of the vat | 160 |
| Distance between the axis of 2 electrodes | 360 |
| Level of the liquid in the vat above the top of the electrodes | 14 |
| Wall 12, int. diameter | 160 |
| Wall 12, ext. diameter | 170 |
| Wall 12, height | 110 |
| Wall 13, int. diameter | 180 |
| Wall 13, ext. diameter | 190 |
| Wall 13, height | 220 |
| The wall 13 is fitted with 10 holes such as 14 having a diameter of | 30 |
| Cylindrical space between the walls 12 and 13 | 5 |

Three phase current 220 v.—50 cycles.

The apparatus is supplied at the top of the column by a 36% HCl solution at 25° C. The exhausted solution containing 20.5% HCl is drained off from the vat at 110° C.

The yield is 400 kgs. HCl 100% per hour.

The consumption of energy is 1 kwh. for each kg. of HCl 100% produced.

The novelty of the invention includes the following elements, alone or in combination:

A process for heating fluids by Joule effect consisting in locating within the fluid to be heated, electrically non-conductive barriers which establish in the liquid one or more zones, extending upwardly, the form and the location of the obstacles establishing these zones being such that the passage of the electric current is canalized in said zones, and the said zones being of reduced section, cause the generation of more heat in the zones than in the remainder of the body of the liquid. These zones are in communication with the remainder of the mass of liquid as elsewhere described. The non-conductive walls may be composed of flat baffles, or they may be composed of baffles arranged in cylindrical or prismatic form.

In a preferred form of the invention, one or more electrodes are individually encircled by co-axial walls, one of which rises from the bottom of the tank containing liquid and to a height less than that of the electrode, the said wall being surrounded by a second wall which, equally co-axial with the electrode, rests on the bottom of the tank by means of feet between which openings exist which permit the passage of fluid, the upper edge of the second wall extending above the level of the liquid in the tank. It is possible to arrange the electrodes and the surrounding walls so that the lines of force are directed principally to the cylindrical surfaces of the electrode and only to a relatively small degree to its end.

The process is particularly advantageous in promoting the distillation of the liquid and in releasing the gaseous bubbles in distillation processes; in the discharge of dissolved gases by thermal expulsion; by improving the application of heat and the generation of heat by injecting bubbles into the base of a canal of liquid of small section whereby to increase the resistance thereof and the heating effect therein; in chemical reactions wherein a gaseous reactant unites with or is absorbed in a liquid reactant, and the process is made more efficient by the application of Joule effect current, by introducing the gas at the base of a column of liquid in accordance with the principles of the invention.

As many apparently widely different embodiments of the present invention may be made without departing from the spirit and scope thereof, it is to be understood that the invention is not limited to the specific embodiments.

What is claimed is:

1. Apparatus for carrying out processes by Joule effect comprising a container for liquid, a plurality of electrodes spaced from each other and located in the part of the container that receives the liquid, barrier means interposed between said electrodes, said barrier being composed of electrically non-conductive material and including a plurality of vertically arranged, overlapping walls one of which extends from above the liquid level downward toward the bottom of the tank and the other of which extends upward from the bottom of the tank toward the liquid level, one of said walls having means to permit the passage of liquid near the bottom and the other having means to permit the passage of liquid near the liquid level, thus compelling the electric current passing between the electrodes to pass through the liquid canal existing between the walls, said walls providing a constricted channel, for the liquid, through which the current between said electrodes passes and in which it is concentrated, and means above the said channel to remove products released therein by said concentrated current.

2. Apparatus for carrying out processes by Joule effect comprising a container for liquid, a plurality of electrodes spaced from each other and located in the part of the container that receives the liquid, barrier means interposed between said electrodes, said barrier being composed of electrically non-conductive material and including a plurality of vertically arranged, overlapping walls one of which extends from above the liquid level downward toward the bottom of the tank and the other of which extends upward from the bottom of the tank toward the liquid level, one of said walls having means to permit the passage of liquid near the bottom and the other having means to permit the passage of liquid near the liquid level, thus compelling the electric current passing between the electrodes to pass through the liquid canal existing between the walls, said walls providing a constricted channel, for the liquid, through which the current between said electrodes passes and in which it is concentrated.

3. Apparatus for Joule effect heating of liquids comprising a plurality of electrodes having parts beneath the liquid level, concentric walls surrounding a said electrode, forming a canal connecting the space about the electrode with the space outside said walls, the inner of said concentric walls being of less height than the depth of the bath, the outer of said walls having means providing for the admission of liquid and the delivery of the current to the canal between the walls at a place on a level with a part of the inner wall, the end of the electrode within said walls extending to a level further from said inner wall than a mid-portion of said electrode, and means to pass Joule effect current from electrode to electrode through said canal.

References Cited in the file of this patent
UNITED STATES PATENTS

| | | |
|---|---|---|
| 1,206,392 | Wheelock | Nov. 28, 1916 |
| 1,221,206 | Mueller | Apr. 3, 1917 |
| 1,462,350 | Merrill et al. | July 17, 1923 |
| 1,685,210 | Baum | Sept. 25, 1928 |
| 2,510,672 | Watson | June 6, 1950 |
| 2,606,276 | Maguth | Aug. 5, 1952 |
| 2,618,732 | Bernd | Nov. 18, 1952 |